United States Patent [19]
Prusak et al.

[11] Patent Number: 4,463,849
[45] Date of Patent: Aug. 7, 1984

[54] VIDEO DISC CADDY

[75] Inventors: John J. Prusak; Bhupendra P. Patel, both of Indianapolis, Ind.

[73] Assignee: RCA Corporation, New York, N.Y.

[21] Appl. No.: 497,341

[22] Filed: May 23, 1983

[51] Int. Cl.³ .................... B65D 85/57; G11B 5/82; G11B 25/04
[52] U.S. Cl. .................... 206/307; 206/309; 206/444; 206/312; 360/133; 369/77.2; 369/291
[58] Field of Search ............ 206/309, 387, 312, 307, 206/444; 360/133; 369/77

[56] References Cited
U.S. PATENT DOCUMENTS
3,864,755 2/1975 Hargis .................... 206/387
4,266,784 5/1981 Torrington .................... 360/133
4,316,539 2/1982 Torrington .................... 360/133

FOREIGN PATENT DOCUMENTS
1054533 2/1954 France .................... 206/307

Primary Examiner—William T. Dixson, Jr.
Attorney, Agent, or Firm—Eugene M. Whitacre; William H. Meise; Dilip A. Kulkarni

[57] ABSTRACT

The video disc caddy comprises a record retaining spine removably received inside an outer protective cover. The spine has an opening for receiving a disc record. Each side of the spine is provided with a pair of oppositely disposed, substantially semicircular wiping pads around the record receiving opening therein.

4 Claims, 3 Drawing Figures

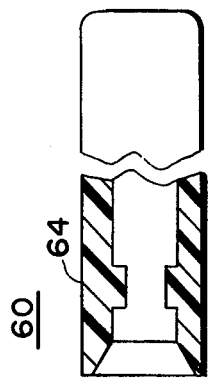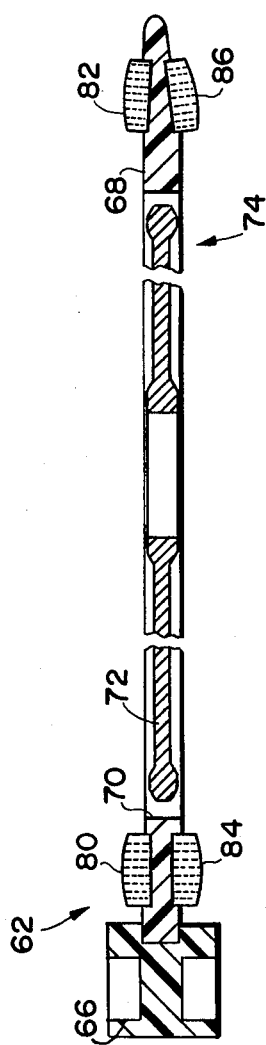
Figure 3

VIDEO DISC CADDY

This invention relates to a disc record package and, more particularly, it pertains to a record package suitable for loading a record into the player and removing it therefrom without the need for touching it.

In certain systems, picture and sound signals are stored on a disc record in the form of physical undulations in a continuous spiral track disposed on the record surface. The variations in electrical capacitance between an electrode disposed on a record-engaging stylus and a conductive property of a turntable-supported video record are sensed as the physical undulations on the record surface pass beneath the stylus tip. The capacitive variations are converted into electrical signals suitable for application to a conventional television receiver.

It is beneficial to enclose a video disc in a caddy which comprises a record retaining spine removably located within an outer sleeve. The sleeve has an edge opening in communication with a record enclosing cavity. The record retaining spine consists of a leading closure portion and a trailing annular portion having an opening in which a record is received. The opening in the annular portion of the spine is slightly larger than the record to allow it to pass freely therethrough. The record retaining spine is provided with a pair of spaced apart locking fingers disposed at the opposite edges thereof to releasably secure the spine to the sleeve. The caddy sleeve is covered with a wrap-around label containing program information and graphics. For record loading, a full caddy is inserted into an input slot provided in the player along a pair of caddy guide rails. A record extraction mechanism disposed in the player removes the record/spine assembly from the sleeve when the sleeve is withdrawn to leave the record/spine assembly inside the player resting on a set of record receiving pads. The retained record is then transferred by a record handling mechanism to a turntable for playback. For record retrieval, the record is transferred back to the receiving pads, and an empty jacket is reinserted into the player to recapture the record/spine assembly.

To obtain adequate playing time on a video disc (e.g., one hour per side), the information packing density is quite high. This, in turn, translates into high groove density (e.g., 10,000 grooves per inch), and minute signal elements (e.g., signal element length—0.3 to 0.8 micrometers and signal element depth—0.10 to 0.15 micrometers). Because of high information density, it is desirable to keep the disc free from dust and debris.

The disc contamination can come from both external and internal sources. An example of external contamination is atmospheric particulate. Debris is also generated due to rubbing of the spine on the internal surfaces of the caddy sleeve during disc ejection and injection cycles. The accumulation of the foreign particles on the disc surface interferes with signal recovery during playback. The situation is aggravated when the dust accumulation is accompanied by the conditions of high temperature and high humidity, which cause the dust to bind to the disc.

In accordance with this invention, each side of the spine is equipped with wiping pads surrounding the record receiving opening therein. The spine wiping pads push the foreign matter out of the way ahead of the disc during its insertion into and removal from the sleeve. The spine wiping pads also serve to reduce the generation of debris inside the caddy enclosure due to friction between the spine and the sleeve. This substantially reduces accumulation of dust on the disc, thereby preventing disc scratching, etc.

In the Drawings:

FIG. 3 illustrates a cross-sectional view of the FIG. 2 video disc caddy.

Figure 1:
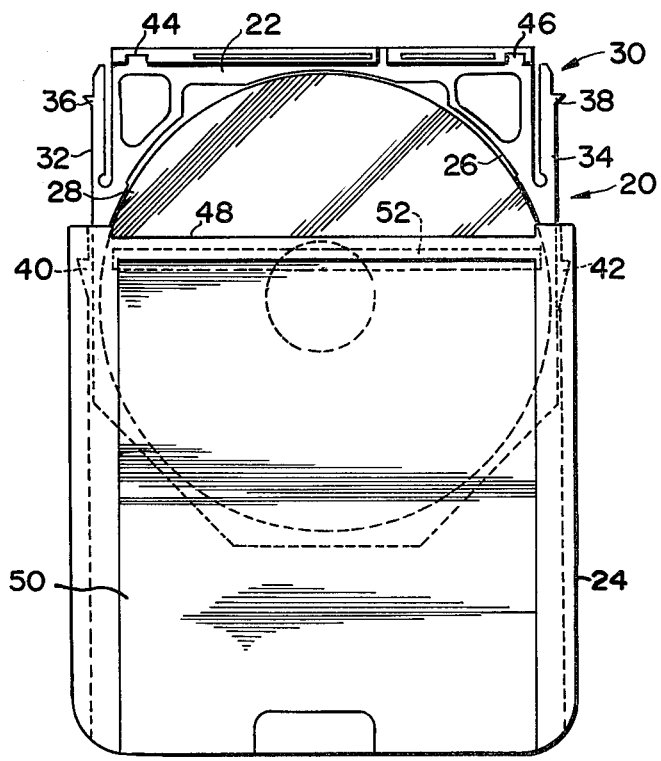
FIG. 1 shows a prior art video disc caddy.

The prior art video disc caddy 20, depicted in FIG. 1, consists of a planar injection-molded plastic record retaining spine 22 removably enclosed in a flat plastic outer sleeve 24. The retaining spine 22 has an opening 26 in which a centrally-apertured record 28 is received forming a record/spine assembly 30. Integrally molded with the spine 22 are spine locking fingers 32 and 34 for releasably securing the spine 22 in its sleeve 24. The spine locking fingers 34 and 36 are fitted with protruding elements 36 and 38 which are received in the respective recesses 40 and 42 provided in the sleeve 24 to hold the spine 22 in place. The spine 22 has cutouts 44 and 46 in which the respective spine latching members of a record extraction mechanism are received to secure the spine to the player, so that the record/spine assembly 30 is retained inside the player when the caddy sleeve 24 is withdrawn. The caddy sleeve 24 defines a record access opening 48 in communication with a record enclosing cavity 50. The front portions of the caddy sleeve 24 forming the edge opening 48 are covered with lip pads 52 (e.g., Sontara made by Dupont) for cleaning the disc during its loading and unloading. Reference may be made to U.S. Pat. No. 4,239,108 (Coleman) for particulars of the caddy construction. U.S. Pat. No. 4,084,691 (Leedom) sets forth the details of the caddy lip pads.

Figure 2:
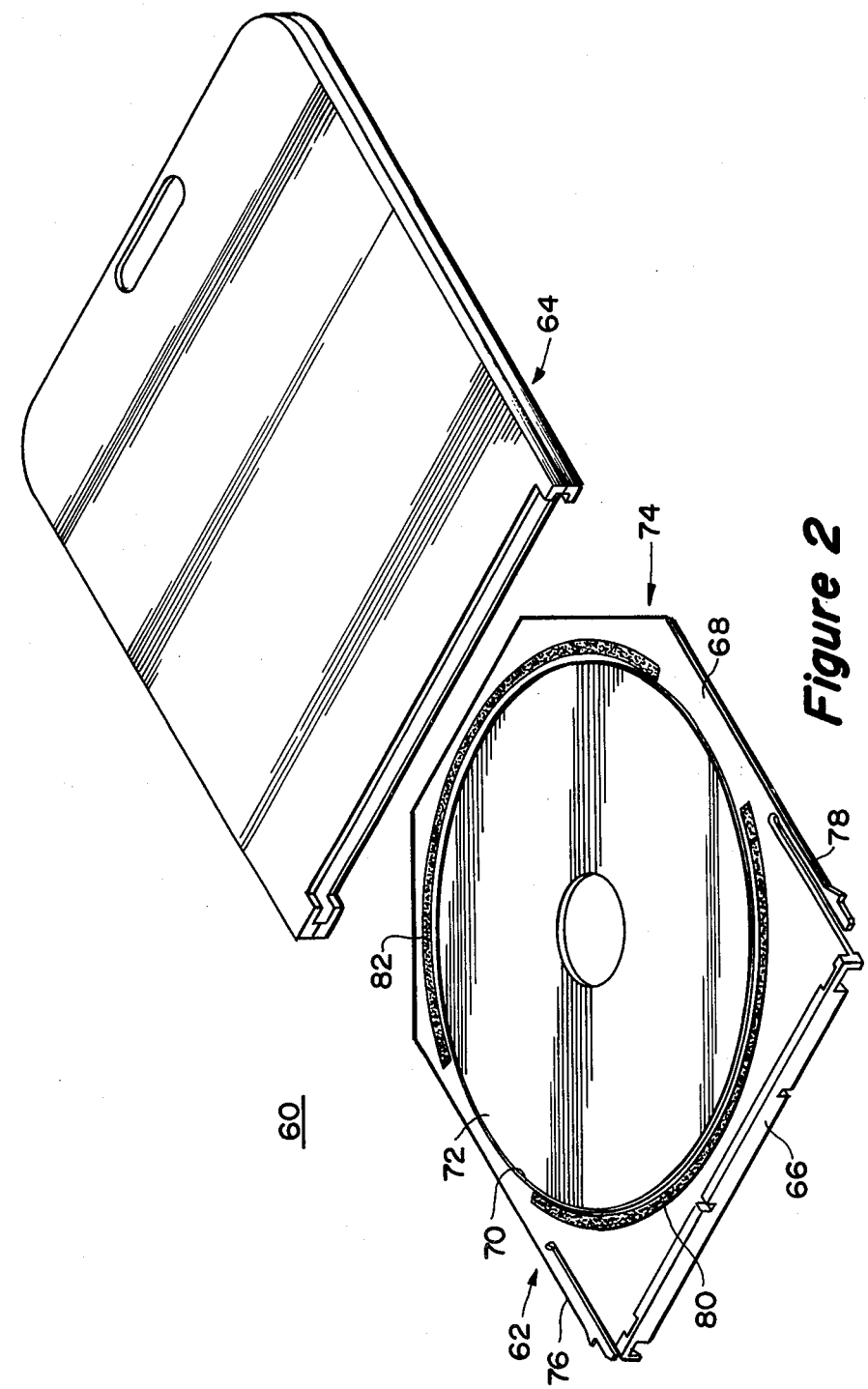
FIG. 2 is a perspective view of an improved video disc caddy in accordance with the subject invention.

FIGS. 2 and 3 illustrate an improved video disc caddy 60 in accordance with this invention. The improved caddy 60 comprises a record retaining spine 62 adapted for reception in an outer jacket 64. The record retaining spine 62 has a front closure portion 66 and a rear annular portion 68. The rear annular portion 68 is provided with a circular opening 70 in which a record 72 is loosely received to form a record/spine assembly 74. The spine 62 is equipped with a pair of latching fingers 76 and 78 which are selectively snapped into the respective pockets (not shown) in the jacket 64 to hold the record/spine assembly 74 in place.

Pursuant to this invention, each side of the spine 62 is provided with a pair of oppositely disposed wiping pads 80, 82 and 84, 86 surrounding the circular record receiving opening 70 in the manner shown in FIGS. 2 and 3. The wiping pads 80–86 are substantially semicircular in shape and are made from velvet material. Alternatively, the wiping pads 80–86 can be made from Sontara fabric made by Dupont.

The subject spine wiping pads 80–86 have been found to effectively reduce generation of debris inside the caddy. The subject wiping pads 80–86 also clear the dust particles in the path of the disc during entry and exit.

What is claimed is:

1. In a disc record package including a record retaining spine removably housed in an outer sleeve; said record retaining spine having a leading closure portion and a trailing annular portion; said trailing annular portion having an opening in which a record is received to form a record/spine assembly; the interior surfaces of said outer sleeve defining an edge opening in communication with a record enclosing cavity in which record/spine assembly is received; said record/spine assembly being subject to insertion into said sleeve, and removal therefrom, through said edge opening; wherein the improvement comprises providing each side of the spine with wiping pads around said record receiving opening in said trailing annular portion for pushing the debris on said interior surfaces of said sleeve out of the way of said record during said insertion and removal.

2. The record package as defined in claim 1 wherein each side of said spine is provided with a pair of oppositely disposed, substantially semicircular wiping pads.

3. The record package as defined in claim 1 wherein said wiping pads are made from velvet material.

4. The record package as defined in claim 1 wherein said wiping pads are made from Sontara material.

* * * * *